United States Patent
Nishizaka et al.

(10) Patent No.: US 9,346,630 B2
(45) Date of Patent: May 24, 2016

(54) ROBOT SYSTEM, ROBOT APPARATUS, AND METHOD FOR PICKING WORKPIECE

(71) Applicant: KABUSHIKI KAISHA YASKAWA DENKI, Kitakyushu-shi (JP)

(72) Inventors: Yoshitaka Nishizaka, Kitakyushu (JP); Ken Nakamura, Kitakyushu (JP); Tomoki Kawano, Kitakyushu (JP); Yutaro Uchida, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/857,754

(22) Filed: Sep. 17, 2015

(65) Prior Publication Data
US 2016/0083198 A1   Mar. 24, 2016

(30) Foreign Application Priority Data
Sep. 18, 2014 (JP) .................................. 2014-190444

(51) Int. Cl.
| | |
|---|---|
| G06F 7/00 | (2006.01) |
| G06F 19/00 | (2011.01) |
| B65G 47/90 | (2006.01) |
| B25J 9/16 | (2006.01) |
| G05B 19/418 | (2006.01) |
| B25J 9/00 | (2006.01) |
| B65G 43/08 | (2006.01) |
| B65G 47/52 | (2006.01) |

(52) U.S. Cl.
CPC ............. *B65G 47/905* (2013.01); *B25J 9/0093* (2013.01); *B25J 9/16* (2013.01); *B25J 9/1679* (2013.01); *B25J 9/1697* (2013.01); *B65G 43/08* (2013.01); *B65G 47/52* (2013.01); *G05B 19/4182* (2013.01); *G05B 19/41815* (2013.01); *G05B 2219/39102* (2013.01); *Y10S 901/02* (2013.01)

(58) Field of Classification Search
None
See application file for complete search history.

(56) References Cited

U.S. PATENT DOCUMENTS

2002/0134710 A1*  9/2002  Nagler ...................... B07C 5/38
                                                                209/509

FOREIGN PATENT DOCUMENTS

JP        2002-316716         10/2002

* cited by examiner

*Primary Examiner* — Yolanda Cumbess
(74) *Attorney, Agent, or Firm* — Mori & Ward, LLP

(57) ABSTRACT

A robot system includes a first conveyor, a second conveyor, a robot, and a controller. The first conveyor conveys a plurality of kinds of workpieces. The second conveyor conveys workpiece groups each including a combination of the workpieces. The controller controls the robot, and includes a situation acquirer, a determiner, and an instructor. The situation acquirer acquires a situation in a predetermined monitor area on the first and second conveyors. The monitor area is set based on a movable range of the robot. Based on the situation, the determiner determines whether one of the workpieces on the first conveyor in the monitor area is a missing workpiece of one of the workpiece groups in the monitor area. The instructor instructs the robot to hold the one workpiece and to transfer the one workpiece from the first conveyor to the second conveyor.

20 Claims, 9 Drawing Sheets

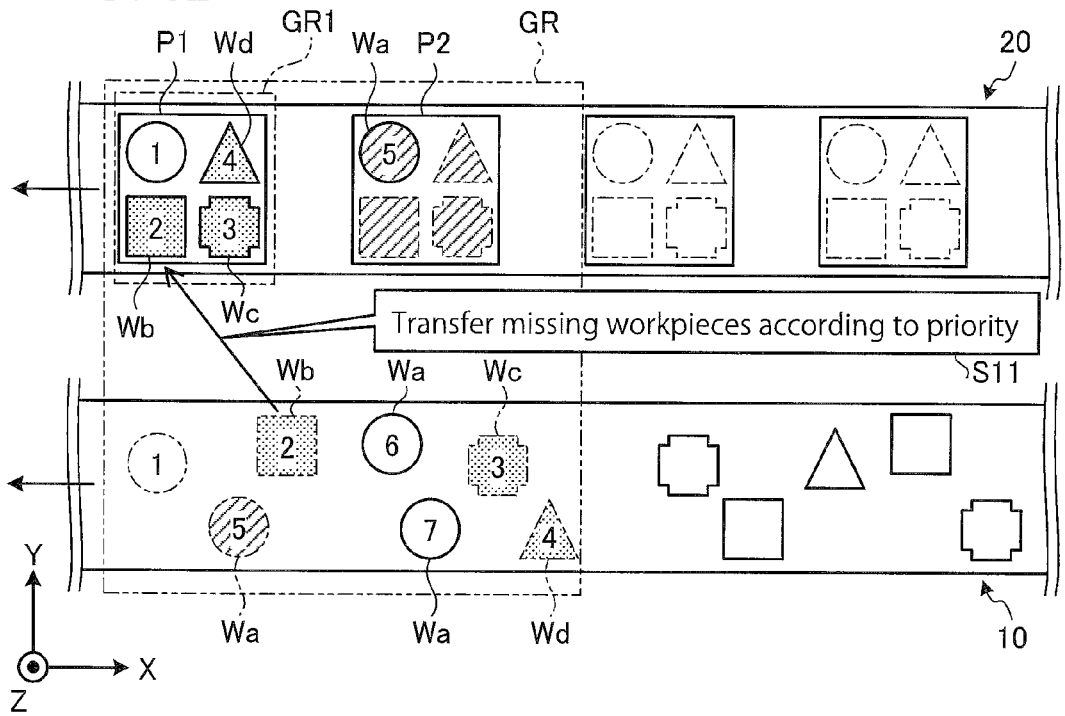

ROBOT SYSTEM, ROBOT APPARATUS, AND METHOD FOR PICKING WORKPIECE

CROSS-REFERENCE TO RELATED APPLICATIONS

The present application claims priority under 35 U.S.C. §119 to Japanese Patent Application No. 2014-190444, filed Sep. 18, 2014. The contents of this application are incorporated herein by reference in their entirety.

BACKGROUND

1. Field of the Invention

The embodiments disclosed herein relate a robot system, a robot apparatus, and a method for picking a workpiece.

2. Discussion of the Background

Japanese Unexamined Patent Application Publication No. 2002-316716 discloses an object processor for use in a robot system in which conveyors or similar devices convey workpieces and robots hold the workpieces to transfer the workpieces to another place.

The object processor includes first and second conveyors and first and second robots. The first and second conveyors convey objects in the same direction. The two robots transfer the objects from the first conveyor to the second conveyor.

Specifically, the first conveyor first conveys a random mixture of different kinds of workpieces. From among the different kinds of workpieces, the first robot holds a first kind of workpieces, one at a time in the order that the first kind of workpieces are conveyed; picks the first kind of workpieces from the first conveyor; and transfers the first kind of workpieces to the second conveyor.

At the downstream area of the first robot, the second robot holds a second kind of workpieces, from among the different kinds of workpieces, that are intended to be combined with the first kind of workpieces in the order that the second kind of workpieces are conveyed; picks the second kind of workpieces from the first conveyor; transfers the second kind of workpieces to the second conveyor; and combines the second kind of workpieces with the first kind of workpieces.

SUMMARY

According to one aspect of the present disclosure, a robot system includes a first conveyor, a second conveyor, a robot, and a controller. The first conveyor is configured to convey a plurality of kinds of workpieces. The second conveyor is configured to convey workpiece groups each including a combination of the plurality of kinds of workpieces. The controller is configured to control the robot, and includes a situation acquirer, a determiner, and an instructor. The situation acquirer is configured to acquire a situation in a predetermined monitor area on the first conveyor and the second conveyor. The predetermined monitor area is set based on a movable range of the robot. Based on the situation acquired by the situation acquirer, the determiner is configured to determine whether at least one workpiece among the plurality of kinds of workpieces on the first conveyor in the predetermined monitor area is a missing workpiece of at least one workpiece group among the workpiece groups in the predetermined monitor area. The instructor is configured to instruct the robot to hold the at least one workpiece determined as the missing workpiece by the determiner and to transfer the at least one workpiece from the first conveyor to the second conveyor.

According to another aspect of the present disclosure, a robot apparatus includes a robot and a controller. The controller is configured to control the robot, and includes a situation acquirer, a determiner, and an instructor. The situation acquirer is configured to acquire a situation in a predetermined monitor area on a first conveyor and a second conveyor. The predetermined monitor area is set in a movable range of the robot. Based on the situation acquired by the situation acquirer, the determiner is configured to determine whether at least one workpiece among the plurality of kinds of workpieces on the first conveyor in the predetermined monitor area is a missing workpiece of at least one workpiece group among the workpiece groups in the predetermined monitor area. The instructor is configured to instruct the robot to hold the at least one workpiece determined as the missing workpiece by the determiner and to transfer the at least one workpiece from the first conveyor to the second conveyor.

According to the other aspect of the present disclosure, a method is for picking a workpiece in a robot system. The robot system includes a first conveyor, a second conveyor, and a robot. The first conveyor is configured to convey a plurality of kinds of workpieces mixed together at random. The second conveyor is configured to convey workpiece groups each including a predetermined combination pattern of the plurality of kinds of workpieces. The method includes controlling the robot. The controlling step includes acquiring a situation in a predetermined monitor area on the first conveyor and the second conveyor. The predetermined monitor area is set based on a movable range of the robot. Based on the situation acquired by the situation acquirer, a determination is made as to whether at least one workpiece among the plurality of kinds of workpieces on the first conveyor in the predetermined monitor area is a missing workpiece of at least one workpiece group among the workpiece groups in the predetermined monitor area. Using the robot, the at least one workpiece determined as the missing workpiece by the determiner is held and transferred from the first conveyor to the second conveyor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 6C is a third diagram illustrating the method according to the second embodiment for picking a workpiece; and FIG. 6D is a fourth diagram illustrating the method according to the second embodiment for picking a workpiece.

DESCRIPTION OF THE EMBODIMENTS

A robot system, a robot apparatus, and a method for picking a workpiece according to embodiments of the present disclosure will be described in detail below with reference to the accompanying drawings. The following embodiments are provided for exemplary purposes only and are not intended to limit the present disclosure.

In the following description, the action of holding a workpiece conveyed on a conveyor and taking the workpiece from the conveyor will be referred to as "picking".

First Embodiment

Figure 1A:
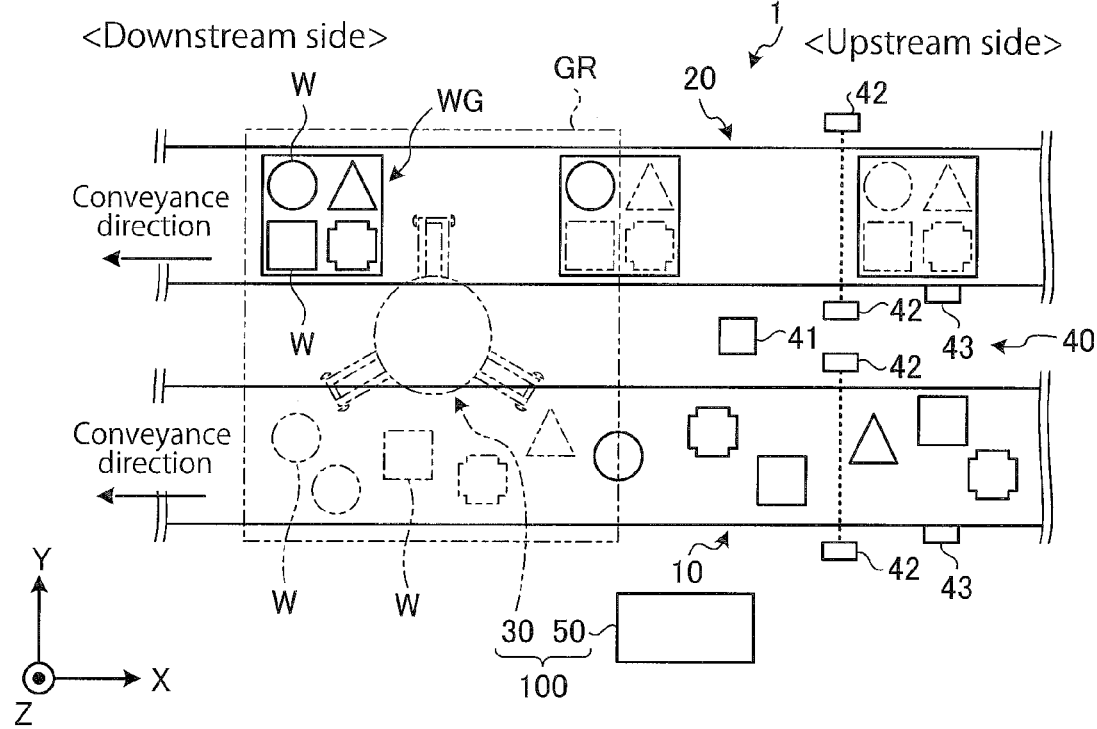
FIG. 1A is a schematic plan view of a robot system according to a first embodiment, illustrating an arrangement configuration of the robot system.
Figure 1B:
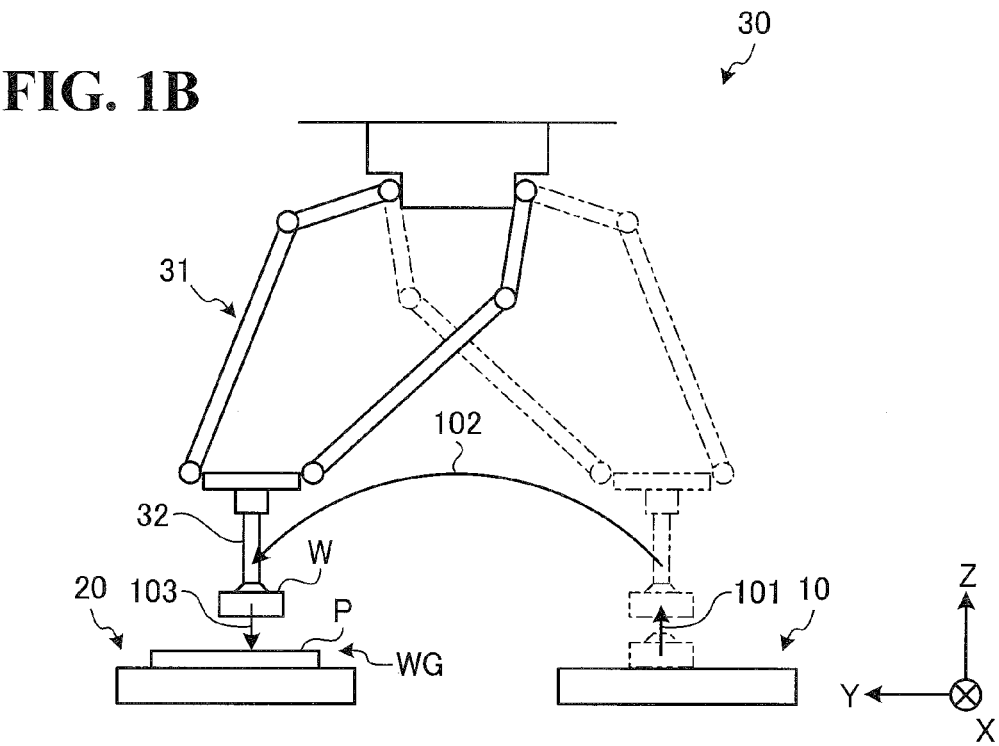
FIG. 1B is a schematic side view of a robot, illustrating a transfer movement of the robot.
Figure 1C:
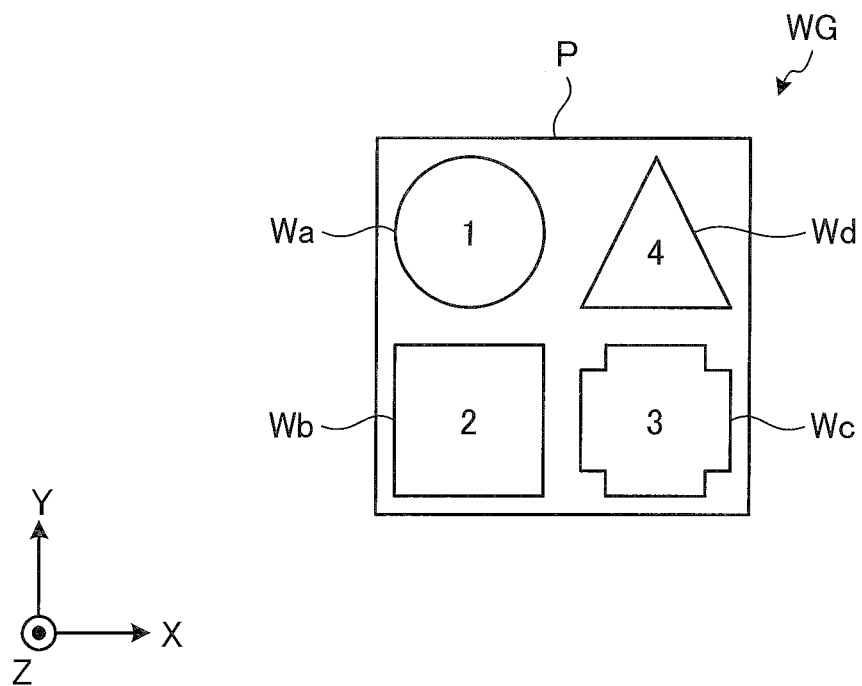
FIG. 1C is a schematic plan view of exemplary workpieces and an exemplary workpiece group.

An outline of a robot system 1 according to a first embodiment will be first described with reference to FIG. 1A to FIG. 1C. FIG. 1A is a schematic plan view of a robot system 1 according to the first embodiment, illustrating an arrangement configuration of the robot system 1. FIG. 1B is a schematic side view of a robot 30, illustrating a transfer movement of the robot 30. FIG. 1C is a schematic plan view of exemplary workpieces W and an exemplary workpiece group WG.

For the ease of description, FIG. 1A illustrates a three-dimensional orthogonal coordinate system including a Z axis with its vertically upward direction being assumed the positive direction. This orthogonal coordinate system may also be illustrated in some other drawings referred to in the following description.

As illustrated in FIG. 1A, the robot system 1 according to the first embodiment includes a first conveyor 10 (corresponding to the first conveyor), a second conveyor 20 (corresponding to the second conveyor), the robot 30, a detector 40, and a controller 50.

The first conveyor 10 is a conveyance device that conveys, from the upstream side toward the downstream side, a plurality of kinds of workpieces W mixed together at random. The second conveyor 20 is a conveyance device that conveys workpiece groups WG from the upstream side toward the downstream side. Each of the workpiece groups WG is a combination of the plurality of kinds of workpieces W.

In the first embodiment, the first conveyor 10 and the second conveyor 20 are belt conveyors. This configuration, however, should not be construed in a limiting sense. The first conveyor 10 and the second conveyor 20 may be any other conveyance devices insofar as the conveyance devices are capable of conveying the workpieces W and the workpiece groups WG in a predetermined conveyance direction. In the first embodiment, the conveyance direction is the negative direction of the X axis.

The first conveyor 10 and the second conveyor 20 are arranged to pass through the movable range of the robot 30. A monitor area GR is set based on the movable range of the robot 30 on the conveyance paths of the first conveyor 10 and the second conveyor 20.

The robot 30 is an articulated robot secured on an installation object such as a ceiling, a wall, and a floor. In the first embodiment, the robot 30 is a parallel link robot with its base secured on a ceiling.

As illustrated in FIG. 1B, the robot 30 picks a plurality of kinds of workpieces W, one at a time, conveyed on the first conveyor 10 (see the arrow 101 in FIG. 1B), and transfers the workpieces W to the second conveyor 20 successively (see the arrow 102 in FIG. 1B). Then, the robot 30 successively places the workpieces W on, for example, pallets P conveyed on the second conveyor 20 (see the arrow 103 in FIG. 1B). Thus, the robot 30 combines the plurality of kinds of workpieces W and generates workpiece groups WG.

The robot 30 includes an arm 31. At the distal end of the arm 31, a holder 32 is attached so as to hold a workpiece W. The holder 32 holds the workpiece W by sucking the workpiece W using a suction device such as a vacuum pump. The holder 32 moves the workpiece W to above the pallet P, and releases the suction force of the suction device. Thus, the robot 30 transfers the workpiece W from the first conveyor 10 to the second conveyor 20. The robot 30 is allowed to transfer the workpieces W in the monitor area GR.

In the first embodiment, the robot 30 includes the single holder 32. This configuration, however, should not be construed in a limiting sense. The robot 30 may include two or more holders 32.

The holder 32 may hold the workpiece W by other than suction. For example, the holder 32 may clamp an end portion of the workpiece W.

In the first embodiment, the robot 30 is a parallel link robot. This configuration, however, should not be construed in a limiting sense. Insofar as the robot 30 is capable of holding and transferring the workpiece W, the robot 30 may be a vertical articulated robot, a horizontal articulated robot, an orthogonal robot, or any other robot.

The detector 40 is disposed at a further upstream position than the robot 30, and detects situations that the first conveyor 10 and the second conveyor 20 are in. As illustrated in FIG. 1A, the detector 40 includes, for example, a camera 41, photoelectric sensors 42, and encoders 43 (each corresponding to the measurer).

The camera 41 picks up an image of predetermined imaging areas on the conveyance paths of the first conveyor 10 and the second conveyor 20 so as to detect conveyance situations of the workpieces W and the workpiece groups WG. Two photoelectric sensors 42 are dedicated to each of the first conveyor 10 and the second conveyor 20. The photoelectric sensors 42 emit and receive light to sense changes in the amount of received light, so as to detect conveyance situations of the workpieces W and the workpiece groups WG.

One encoder 43 is dedicated to each of the first conveyor 10 and the second conveyor 20, and detects rotation situations of the first conveyor 10 and the second conveyor 20. Results of the detections performed by the camera 41, the photoelectric sensors 42, and the encoders 43 are output to the controller 50 through a communication network (not illustrated) such as Local Area Network (LAN).

The controller 50 is coupled in a communicable manner to various elements such as the first conveyor 10, the second conveyor 20, the robot 30, and the detector 40. It is noted that any form of connection, wired or wireless, may be employed. The controller 50 includes various control units, processors, and storages so as to control operations of the various elements coupled to the controller 50.

For example, based on a job program acquired through an input device (such as a programming pendant), not illustrated, or through a higher device, the controller 50 generates a movement signal to cause the robot 30 to operate. Then, the controller 50 outputs the movement signal to the robot 30 to control the movement of the robot 30.

The movement signal is generated in the form of, for example, a pulse signal to each servomotor in each joint of the robot 30. A specific configuration of the controller 50 will be described later with reference to FIG. 4.

With the above-described configuration of the robot system 1 according to the first embodiment, the detector 40 detects situations that the first conveyor 10 and the second conveyor 20 are in. Based on the situations detected by the detector 40, the controller 50 acquires a situation in the monitor area GR.

Based on the situation in the monitor area GR, the controller 50 instructs the robot 30 to pick a workpiece W using the holder 32 and transfer the workpiece W from the first conveyor 10 to the second conveyor 20. In response to the instruction from the controller 50, the robot 30 performs the transfer movement.

In the transfer movement of the workpiece W, the robot system 1 according to the first embodiment selects a manner of picking that the robot system 1 determines as effective considering the situation in the monitor area GR, so as to eliminate or minimize a missed transfer to the second conveyor 20. Thus, the robot system 1 performs a more highly efficient transfer movement. This configuration will be described in more detail below with reference to FIG. 2 and later drawings.

Prior to the description with reference to FIG. 2 and later drawings, exemplary workpieces W and exemplary workpiece groups WG will be described. In the following description, as illustrated in FIG. 1C, a workpiece group WG is generated by combining four kinds of workpieces Wa, Wb, Wc, and Wd on a pallet P.

In the drawings referred to in the following description, as represented by FIG. 1C, the workpieces Wa, Wb, Wc, and Wd are occasionally denoted with reference numerals. The reference numerals indicate the "transfer order". Also, in a context in which the kinds of the workpieces are irrelevant, the workpieces Wa, Wb, Wc, and Wd will be collectively referred to as "workpieces W".

Reference numeral "100" in FIG. 1A will be described later in the description of other embodiments.

Next, by referring to FIG. 2 to FIG. 3C, a method according to the first embodiment for picking a workpiece will be described in comparison with a comparative method for picking a workpiece. FIG. 2 is a diagram illustrating the comparative method for picking a workpiece.

Figure 2:
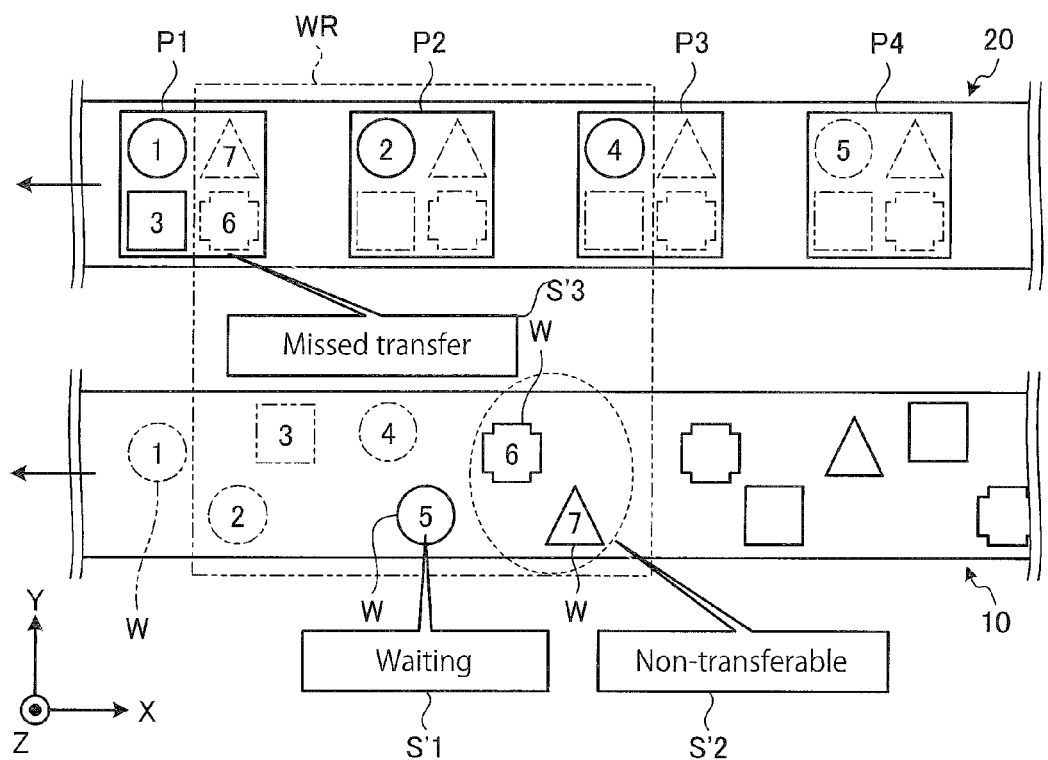
FIG. 2 is a diagram illustrating a method according to a comparative example for picking a workpiece.
Figure 3A:
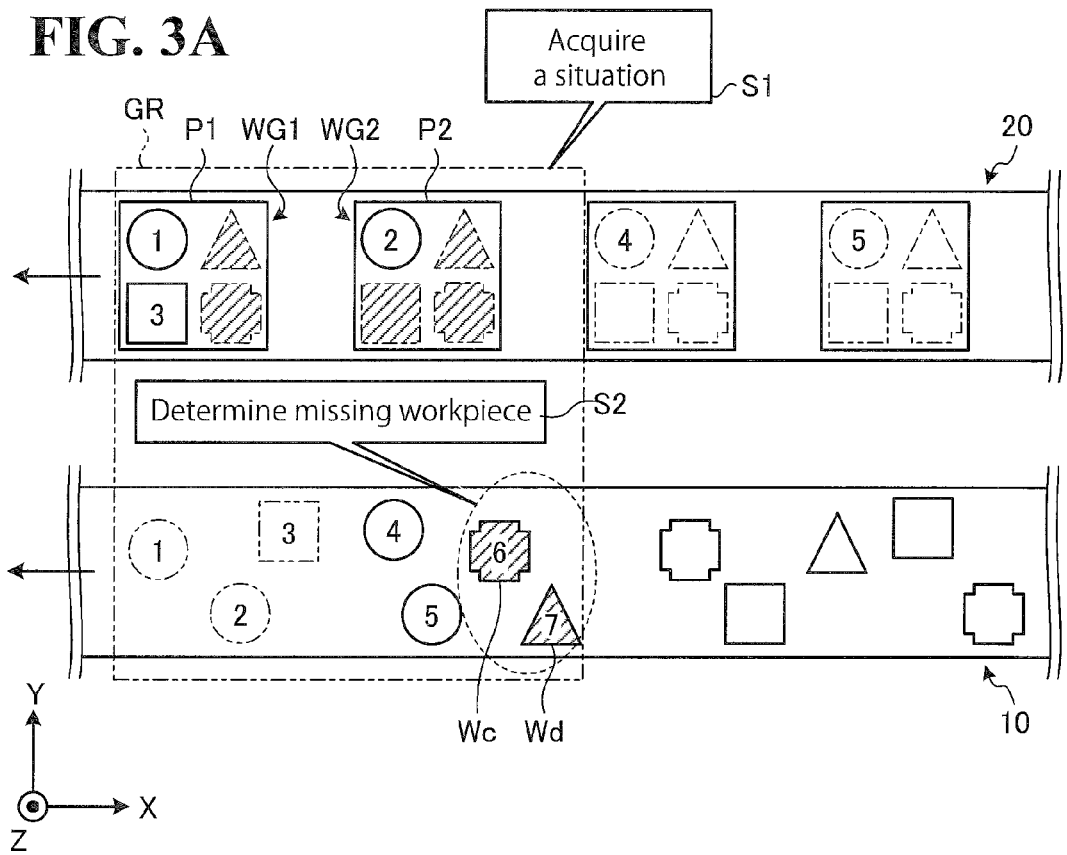
FIG. 3A is a first diagram illustrating a method according to the first embodiment for picking a workpiece.
Figure 3B:
FIG. 3B is a second diagram illustrating the method according to the first embodiment for picking a workpiece.
Figure 3C:
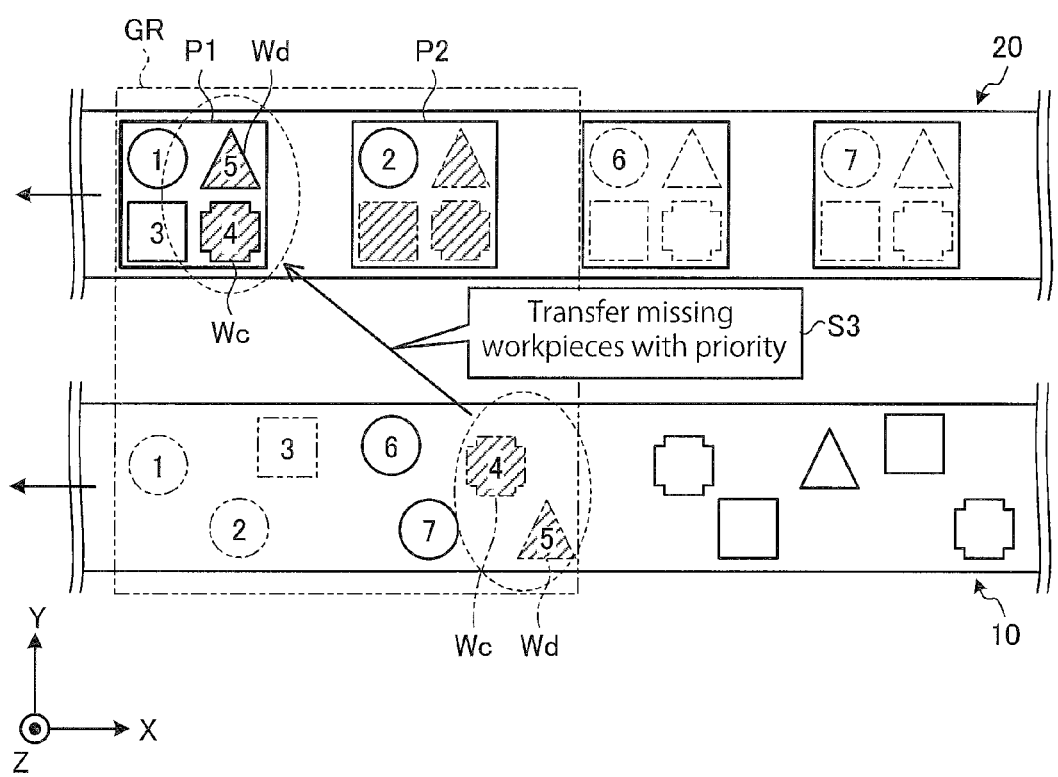
FIG. 3C is a third diagram illustrating the method according to the first embodiment for picking a workpiece.

FIGS. 3A to 3C are first to third diagrams illustrating the method according to the first embodiment for picking a workpiece. In the comparative method illustrated in FIG. 2, the elements used are identical to the elements used in the method according to the first embodiment, and like reference numerals designate corresponding or identical elements throughout FIGS. 2 to 3C for convenience of description.

In FIGS. 2 to 3C, the workpieces W indicated by phantom lines are imaginary workpieces W, and the workpieces W indicated by solid lines are real workpieces W. That is, the workpieces W indicated by phantom lines on the first conveyor 10 are workpieces W that have already been transferred to the second conveyor 20, while the workpieces W indicated by solid lines on the first conveyor 10 are workpieces W yet to be transferred to the second conveyor 20.

As illustrated in FIG. 2, in the comparative method for picking a workpiece, workpieces W are picked in the order that the workpieces are conveyed on the first conveyor 10 and successively transferred to the second conveyor 20. In the situation illustrated in FIG. 2, the workpieces W numbered "1" to "4" in the transfer order are successively transferred to pallets P1 to P3 on the second conveyor 20. The workpiece W numbered "5" in the transfer order, however, has nowhere to be transferred on the second conveyor 20 until a pallet P4 enters a movable range WR of the robot 30. This configuration causes the robot 30 to wait (step S'1) for the pallet P4 to enter the movable range WR.

While the robot 30 is waiting, the workpieces W numbered "6" and "7" in the transfer order are unable to be transferred, even though the "6" and "7" workpieces W are within the movable range WR (step S'2). Thus, there is a possibility of the pallet P1 lacking in combination with the "6" and "7" workpieces W (step S'3).

In view of the possible lack of combination, the method according to the first embodiment for picking a workpiece includes acquiring a situation in the monitor area GR; and based on the acquired situation, making a determination as to whether any of the workpieces W on the first conveyor 10 in the monitor area GR are missing workpieces of any of the workpiece groups WG in the monitor area GR. In other words, the first embodiment takes into consideration situations in which the workpiece groups WG are generated on the second conveyor 20, which are not taken into consideration in the comparative method.

In the method according to the first embodiment for picking a workpiece, when there are missing workpieces W on the first conveyor 10, at least one of the missing workpieces W is picked and transferred from the first conveyor 10 to the second conveyor 20. That is, in the method according to the first embodiment for picking a workpiece, there are exceptions to the usual order of conveyance that the workpieces W are transferred in order that the workpieces W are conveyed on the first conveyor 10.

Specifically, as illustrated in FIG. 3A, an exemplary step of the method according to the first embodiment for picking a workpiece is to, prior to every one of the workpieces W being picked, acquire a situation in the monitor area GR based on the results of the detections performed by the detector 40 (step S1).

Then, based on the acquired situation in the monitor area GR, a determination is made as to whether any of the workpieces W on the first conveyor 10 in the monitor area GR are a missing workpiece of any of the workpiece groups WG in the monitor area GR (step S2).

In the situation in the monitor area GR illustrated in FIG. 3A, the method according to the first embodiment for picking a workpiece determines that a workpiece Wc, which is numbered "6" in the transfer order, and a workpiece Wd, which is numbered "7" in the transfer order, on the first conveyor 10 are missing workpieces in a pallet P1 and a pallet P2 on the second conveyor 20. In FIGS. 3A to 3C, the missing workpieces W on the first conveyor 10 and the second conveyor 20 are shaded by slanting lines.

As illustrated in FIG. 3B, the "6" workpiece Wc and the "7" workpiece Wd in the transfer order on the first conveyor 10, which have been determined as missing workpieces W, are respectively advanced to "4" and "5" in the transfer order. It is noted that since the workpiece Wc is at a further downstream position than the workpiece Wd on the first conveyor 10, the workpiece Wc is prioritized over the workpiece Wd.

As illustrated in FIG. 3C, according to the changed transfer order, the workpieces Wc and Wd, which have been determined as missing workpieces W, are prioritized in the transfer to the second conveyor 20 (step S3).

It is noted that the workpieces Wc and Wd are missing workpieces W both in the pallet P1 and the pallet P2, and that in the first embodiment, priority is given to the pallet P1, which is at a further downstream position than the pallet P2, to accept the workpieces Wc and Wd. In another embodiment where the conveyance situations of the first conveyor 10 and the second conveyor 20 lead to a determination that no lack of combination is expected to occur in the pallet P1 nor the pallet P2, the workpieces We and Wd may be transferred to the pallet P2.

Thus, in comparison with the comparative method, the method according to the first embodiment for picking a workpiece eliminates or minimizes lack of combination of the workpieces W, that is, ensures reliable transfer of the workpieces W. The method according to the first embodiment also eliminates the need for decelerating or stopping the first conveyor 10 and the second conveyor 20, and thus improves conveyance efficiency. That is, the workpieces W are transferred more efficiently by the method according to the first embodiment.

Figure 4:
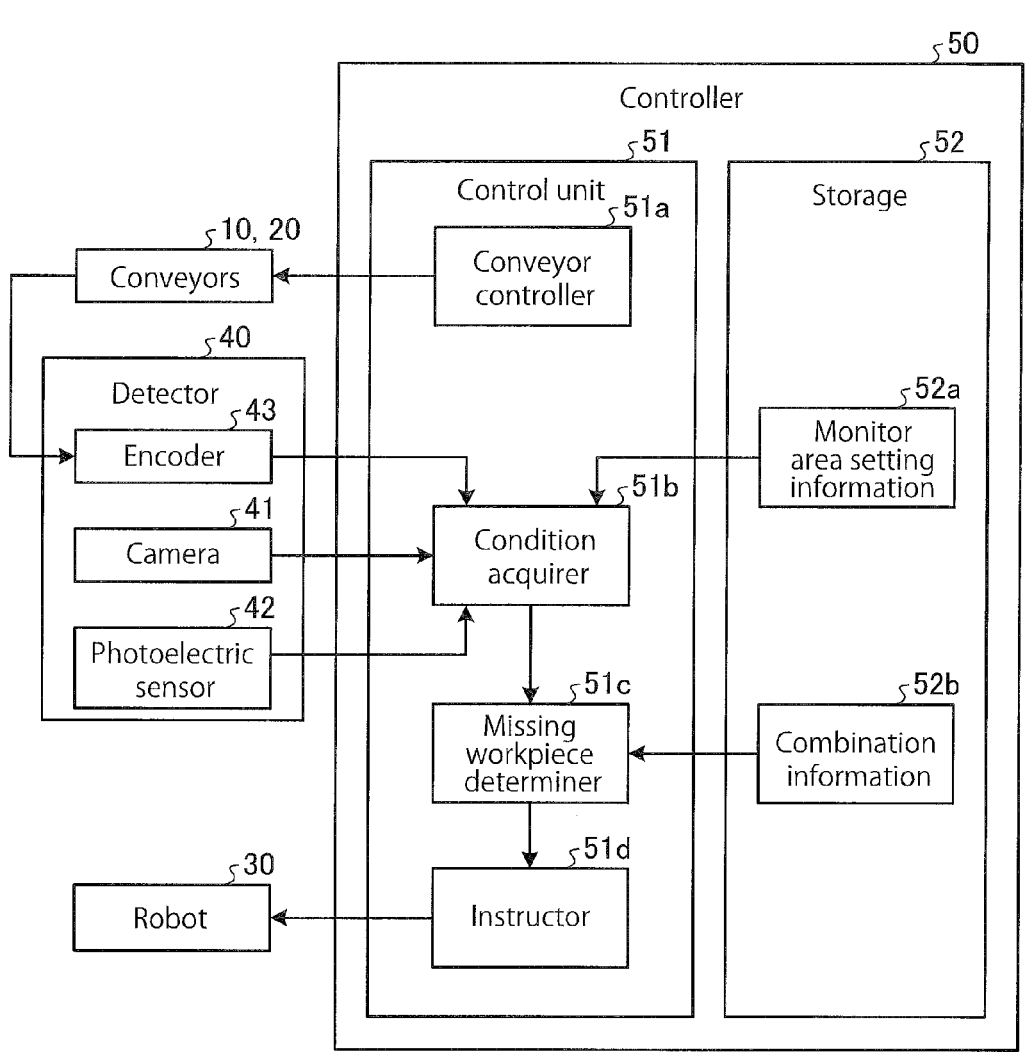
FIG. 4 is a block diagram illustrating the robot system according to the first embodiment.

Next, by referring to FIG. 4, a block configuration of the robot system 1 according to the first embodiment will be described. FIG. 4 is a block diagram illustrating the robot system 1 according to the first embodiment. It is noted that FIG. 4 only illustrates those components necessary for description of the robot system 1, omitting those components of general nature.

The following description by referring to FIG. 4 will mainly focus on the internal configuration of the controller 50, and may occasionally simplify or omit the components that have been already described by referring to the drawings such as FIG. 1A.

As illustrated in FIG. 4, the controller 50 includes a control unit 51 and a storage 52. The control unit 51 further includes a conveyor controller 51a, a situation acquirer 51b, a missing workpiece determiner 51c (corresponding to the determiner), and an instructor 51d.

The storage 52 is a storage device such as a hard disk drive and a non-volatile memory, and stores monitor area setting information 52a and combination information 52b.

It is noted that not all the elements of the controller 50 illustrated in FIG. 4 need to be arranged within the single controller 50. Another possible example is that at least one of the monitor area setting information 52a and the combination information 52b stored in the storage 52 is stored in an inner memory of the robot 30. Still another possible example is that at least one of the monitor area setting information 52a and the combination information 52b is stored in an upper-level device upper than the controller 50 and acquired as necessary from the upper-level device by the controller 50.

A non-limiting example of the control unit 51 is a Central Processing Unit (CPU) that is in charge of overall control of the controller 50. The conveyor controller 51a controls the first conveyor 10 and the second conveyor 20 to convey workpieces W and workpiece groups WG (occasionally, pallets P without workpieces W in the pallets P) to the monitor area GR of the robot 30. The first conveyor 10 and the second conveyor 20 will be collectively referred to as conveyors 10 and 20 in FIG. 4.

Based on the monitor area setting information 52a, the situation acquirer 51b sets an imaginary monitor area GR on the first conveyor 10 and the second conveyor 20. The situation acquirer 51b acquires a situation in the monitor area GR as the situation acquirer 51b finds it necessary considering the results of the detections performed by the detector 40.

The monitor area setting information 52a is information required for setting the monitor area GR, and includes information such as the positions and dimensions of the movable range WR of the robot 30, the widths of the first conveyor 10 and the second conveyor 20, and the distance of the camera 41 from an imaging area.

Specifically, the situation acquirer 51b acquires situations of the workpieces W and the workpiece groups WG in the monitor area GR based on an image received from the camera 41, based on sensing data received from the photoelectric sensors 42, and based on rotation situations of the conveyors 10 and 20 received from the encoders 43. The situation acquirer 51b notifies the missing workpiece determiner 51c of the acquired situations.

Based on the acquired situations notified from the situation acquirer 51b, the missing workpiece determiner 51c determines whether any of the workpieces W on the first conveyor 10 in the monitor area GR are missing workpieces of any of the workpiece groups WG in the monitor area GR.

In this determination, the missing workpiece determiner 51c also refers to the combination information 52b. The combination information 52b includes combinations of a plurality of kinds of workpieces W that constitute the workpiece groups WG. The missing workpiece determiner 51c notifies the instructor 51d of the determination.

Based on the determination notified from the missing workpiece determiner 51c, the instructor 51d instructs the robot 30 to pick at least one of the workpieces W determined as missing workpieces, and to transfer the one workpiece W from the first conveyor 10 to the second conveyor 20.

Specifically, when there is a workpiece W determined as a missing workpiece W by the missing workpiece determiner 51c, the instructor 51d instructs the robot 30 to hold and transfer the workpiece W by the method according to the first embodiment for picking a workpiece (see FIGS. 3B and 3C).

Figure 5:
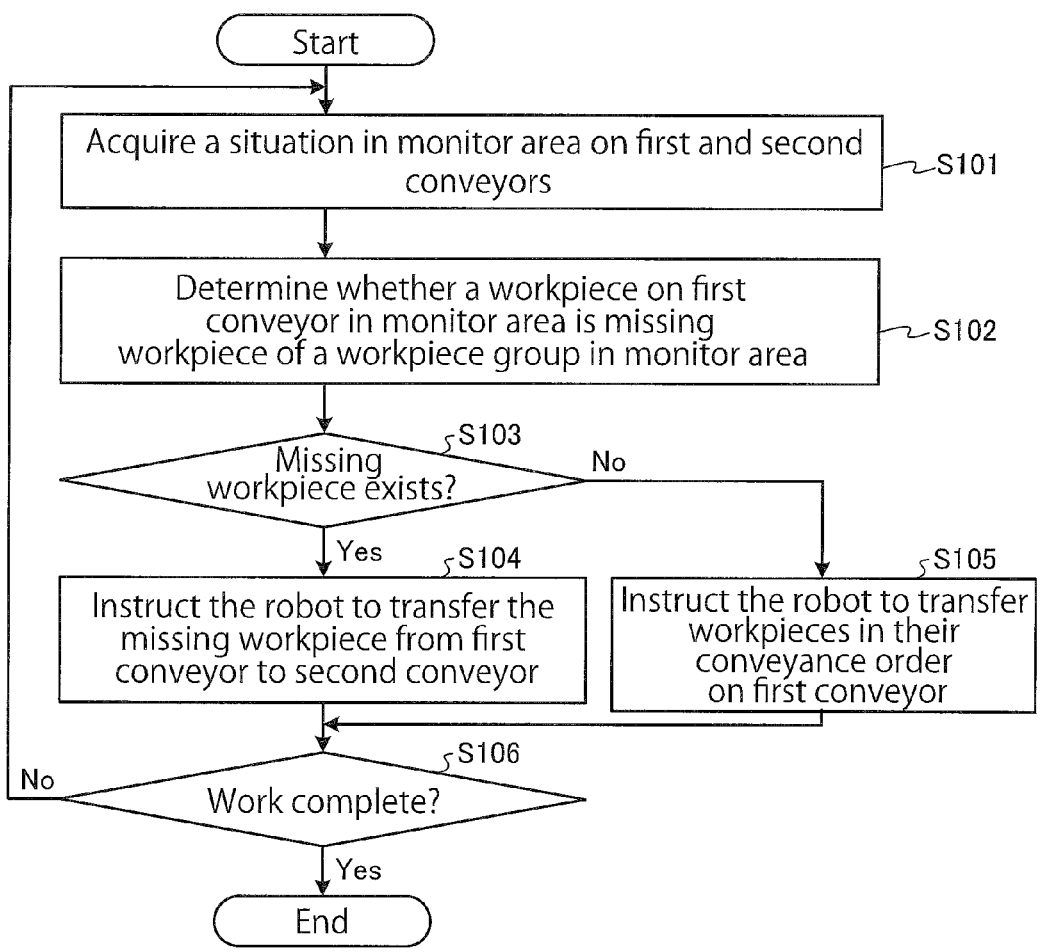
FIG. 5 is a flowchart of a procedure for processing performed by the robot system according to the first embodiment.

Next, by referring to FIG. 5, a procedure for processing performed by the robot system 1 according to the first embodiment will be described. FIG. 5 is a flowchart of the procedure for the processing performed by the robot system 1 according to the first embodiment.

As illustrated in FIG. 5, the situation acquirer 51b acquires a situation in a predetermined monitor area GR on the first conveyor 10 and the second conveyor 20 (step S101). For example, the situation acquirer 51b acquires a situation in the monitor area GR prior to every operation of picking each workpiece W from the first conveyor 10.

Next, based on the situation notified from the situation acquirer 51b, the missing workpiece determiner 51c determines whether any of the workpieces W in the monitor area GR on the first conveyor 10 are missing workpieces of any of the workpiece groups WG in the monitor area GR (step S102).

When the determination indicates that there are missing workpieces W ("Yes" at step S103), the instructor 51d instructs the robot 30 to transfer at least one of the missing workpieces W from the first conveyor 10 to the second conveyor 20 (step S104).

When the determination indicates that there are no missing workpieces W ("No" at step S103), the instructor 51d instructs the robot 30 to transfer the workpieces W on the first conveyor 10 in the order that the workpieces W are conveyed on the first conveyor 10 (step S105).

Then, a determination is made as to whether the work is complete (step S106). When the work is complete ("Yes" at step S106), the processing ends. When the work is not complete ("No" at step S106), the controller 50 repeats the processing that starts from step S101.

As has been described hereinbefore, the robot system according to the first embodiment includes the first conveyor (corresponding to the first conveyor), the second conveyor (corresponding to the second conveyor), the robot, and the controller. The first conveyor conveys a plurality of kinds of workpieces. The second conveyor conveys workpiece groups each including a combination of the plurality of kinds of workpieces. The robot makes a predetermined movement. The controller controls the movement of the robot.

The controller includes the situation acquirer, the missing workpiece determiner (corresponding to the determiner), and the instructor. The situation acquirer acquires a situation in the predetermined monitor area on the first conveyor and the second conveyor. The predetermined monitor area is set based on the movable range of the robot. Based on the situation acquired by the situation acquirer, the missing workpiece determiner determines whether any of the workpieces on the first conveyor in the monitor area are missing workpieces of any of the workpiece groups in the monitor area.

The instructor instructs the robot to hold at least one of the workpieces determined as missing workpieces W by the determiner and to transfer the one workpiece from the first conveyor to the second conveyor.

With this configuration, the robot system according to the first embodiment ensures more efficient transfer of the workpieces.

In the first embodiment, when any of the workpieces on the first conveyor in the monitor area are missing workpieces of at least one of the workpiece groups on the second conveyor, any of the missing workpieces are picked and transferred to the second conveyor. This configuration, however, should not be construed in a limiting sense.

Another possible embodiment is to prioritize a missing workpiece of a workpiece group in a most downstream area of the second conveyor. This configuration will be described below with reference to a second embodiment illustrated in FIGS. 6A to 6D.

Second Embodiment

FIGS. 6A to 6D are respectively first to fourth diagrams illustrating a method according to the second embodiment for picking a workpiece. For convenience of description, like reference numerals designate corresponding or identical elements throughout the first and second embodiments. Also for convenience of description, the robot system according to the second embodiment is denoted with reference numeral "1'", not illustrated.

Figure 6A:
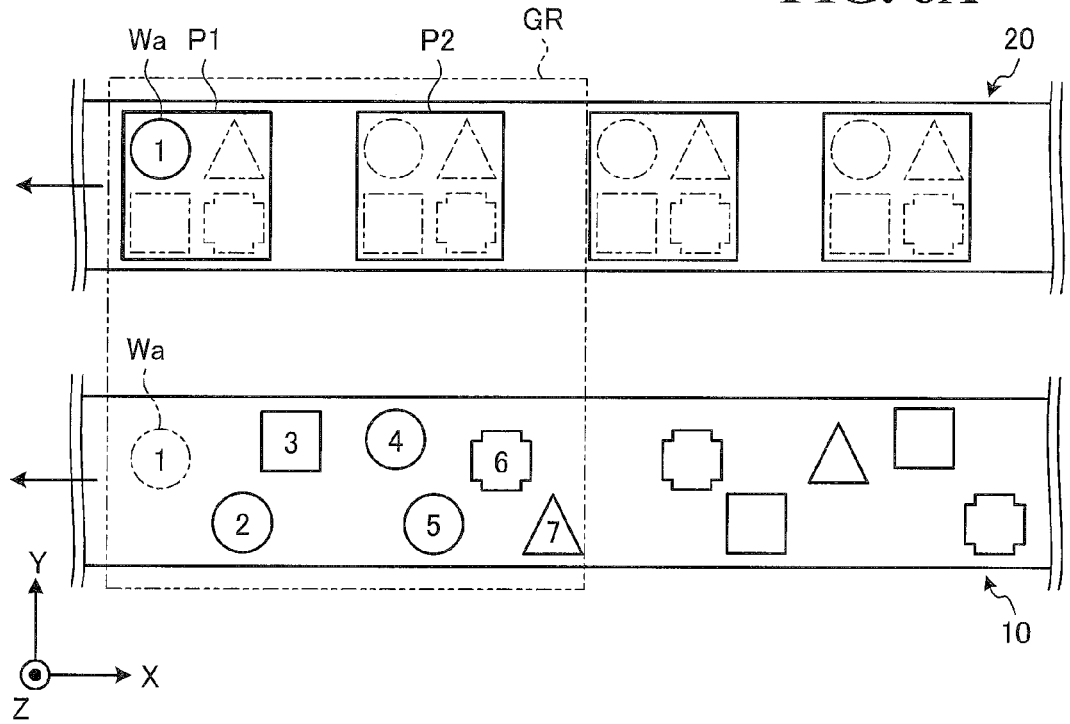
FIG. 6A is a first diagram illustrating a method according to a second embodiment for picking a workpiece.

The following description will be provided under the assumption that the situation illustrated in FIG. 6A is the situation in the monitor area GR acquired after a workpiece Wa numbered "1" in the transfer order has been transferred from the first conveyor 10 to a pallet P1 on the second conveyor 20.

The method according to the second embodiment for picking a workpiece is different from the first embodiment in that a missing workpiece W of a workpiece group WG in a most downstream area of the second conveyor 20 is prioritized.

Figure 6B:
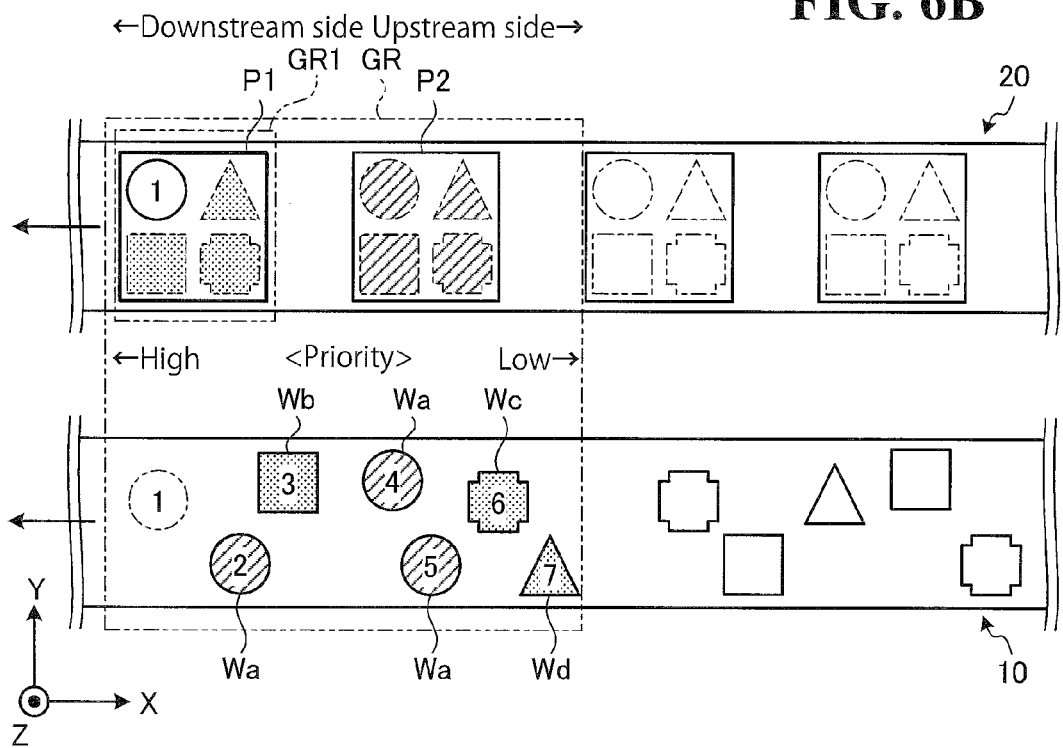
FIG. 6B is a second diagram illustrating the method according to the second embodiment for picking a workpiece.

Specifically, as illustrated in FIG. 6B, the method according to the second embodiment for picking a workpiece gives higher priority to workpieces W in a downstream area of the monitor area GR, and gives lower priority to workpieces W in an upstream area of the monitor area GR. In the most downstream area of the second conveyor 20 in the monitor area GR, a monitor area GR1 is set. The monitor area GR1 is given highest priority.

Next, similarly to the first embodiment, a determination is made as to whether any of the workpieces W on the first conveyor 10 in the monitor area GR are missing workpieces of any of the workpiece groups WG in the monitor area GR. In the method according to the second embodiment for picking a workpiece, the determination is made separately for the monitor area GR1 and for the rest of the monitor area GR.

Assume that the determination is made in the situation illustrated in FIG. 6A. Under this assumption, as illustrated in FIG. 6B, the determination made for the monitor area GR1 is that a workpiece Wb, which is numbered "3" in the transfer order, a workpiece Wc, which is numbered "6" in the transfer order, and a workpiece Wd, which is numbered "7" in the transfer order, are missing workpieces in a pallet P1 in the monitor area GR1. In FIG. 6B to FIG. 6D, the missing workpieces W are shaded by fine dots.

The determination made for the rest of the monitor area GR is that workpieces Wa, which are "2", "4", and "5" in the transfer order, are missing workpieces in a pallet P2. In FIG. 6B to FIG. 6D, the missing workpieces W are shaded by slanting lines.

As illustrated in FIG. 6C, the workpiece Wb, the workpiece Wc, and the workpiece Wd, which are respectively numbered "3", "6", and "7" in the transfer order and which have been prioritized as missing workpieces W in the monitor area GR1, are respectively advanced to "2", "3", and "4" in the transfer order.

The workpieces Wa, which are numbered "2", "4", and "5" in the transfer order and which have been determined as missing workpieces W in the rest of the monitor area GR, are respectively increased to "5", "6", and "7" in the transfer order. The workpiece Wa circled by a dashed line in FIG. 6C has originally been transferrable with highest priority and is now lowered in priority. This configuration may not necessarily be applicable when the conveyance situation of the first conveyor 10 leads to such a determination that there is a possibility of the workpiece Wa lacking in combination on the second conveyer 20.

As illustrated in FIG. 6D, the prioritized missing workpieces W are transferred to the second conveyor 20 in the transfer order thus changed (step S11).

Thus, the method according to the second embodiment for picking a workpiece eliminates or minimizes lack of combination of the workpieces W, that is, ensures reliable transfer of the workpieces W. That is, the workpieces W are transferred more efficiently by the method according to the second embodiment.

As has been described hereinbefore, the method according to the second embodiment for picking a workpiece prioritizes a missing workpiece W of a workpiece group WG in the most downstream area of the second conveyor 20.

That is, in the robot system 1' according to the second embodiment, the instructor 51d instructs the robot 30 to prioritize one workpiece W that is among the workpieces W determined as missing workpieces W by the missing workpiece determiner 51c and that is in the most downstream area of the second conveyor 20 in the monitor area GR. The robot 30 holds and transfers the prioritized one workpiece W. This configuration ensures more efficient transfer of the workpieces W.

Other Embodiments

The first and second embodiments are implemented using the following robot apparatus.

A robot apparatus 100 (see FIGS. 1A and 4) includes the robot 30 and the controller 50. The controller 50 controls the movement of the robot 30, and includes the situation acquirer 51b, the missing workpiece determiner 51c, and the instructor 51d. The situation acquirer 51b acquires a situation in a predetermined monitor area GR on the first and second conveyers 10 and 20. The predetermined monitor area GR is set based on the movable range of the robot 30. Based on the situation acquired by the situation acquirer 51b, the missing workpiece determiner 51c determines whether any of the workpieces W on the first conveyor 10 in the monitor area GR are missing workpieces of any of the workpiece groups WG in the monitor area GR. The instructor 51d instructs the robot 30 to hold at least one of the workpieces W determined as the missing workpieces W by the missing workpiece determiner 51c, and to transfer the at least one workpiece W from the first conveyor 10 to the second conveyor 20.

In the above-described embodiments, the transfer order in which the robot picks the workpieces is changed to eliminate or minimize lack of combination of the workpieces, in an attempt to transfer the workpieces more efficiently. This configuration, however, should not be construed in a limiting sense. Another possible embodiment is to add control to change the conveyance speeds of the conveyors.

Specifically, in accordance with the detector 40's detection of the rotation situation of the conveyors 10 and 20 and the conveyance situation of the workpieces W, the instructor 51d calculates appropriate control values for the conveyors 10 and 20 to eliminate or minimize lack of combination and missed picking, and instructs the conveyor controller 51a with the control values (see FIG. 4). It will be readily appreciated that the above-described embodiments are implementable without the control to change the conveyance speeds of the conveyors.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
    a first conveyor configured to convey a plurality of kinds of workpieces;
    a second conveyor configured to convey workpiece groups each comprising a combination of the plurality of kinds of workpieces;
    a robot; and
    a controller configured to control the robot, the controller comprising:
        a situation acquirer configured to acquire a situation in a predetermined monitor area on the first conveyor and the second conveyor, the predetermined monitor area being set based on a movable range of the robot;
        a determiner configured to, based on the situation acquired by the situation acquirer, determine whether at least one workpiece among the plurality of kinds of workpieces on the first conveyor in the predetermined monitor area is a missing workpiece of at least one workpiece group among the workpiece groups in the predetermined monitor area; and
        an instructor configured to instruct the robot to hold the at least one workpiece determined as the missing workpiece by the determiner and to transfer the at least one workpiece from the first conveyor to the second conveyor.

2. The robot system according to claim 1,
    wherein the at least one workpiece determined as the missing workpiece by the determiner comprises a plurality of missing workpieces, and
    wherein the instructor is configured to instruct the robot to hold one missing workpiece, among the plurality of missing workpieces, that is positioned in a downstream area of the first conveyor in the predetermined monitor area, and to transfer the one missing workpiece from the first conveyor to the second conveyor.

3. The robot system according to claim 1,
    wherein the at least one workpiece determined as the missing workpiece by the determiner comprises a plurality of missing workpieces,
    wherein the at least one workpiece group among the workpiece groups in the predetermined monitor area is positioned in a most downstream area of the second conveyor in the predetermined monitor area, and
    wherein the instructor is configured to instruct the robot to prioritize one missing workpiece, among the plurality of missing workpieces, that is the missing workpiece of the at least one workpiece group so as to hold the one missing workpiece and transfer the one missing workpiece from the first conveyor to the second conveyor.

4. The robot system according to claim 1, further comprising a detector configured to detect a conveyance situation of the first conveyor and the second conveyor,
    wherein the situation acquirer is configured to acquire the situation in the predetermined monitor area based on the conveyance situation detected by the detector.

5. The robot system according to claim 4, wherein the detector comprises a photoelectric sensor.

6. The robot system according to claim 4, wherein the detector comprises a camera configured to pick up an image of the first conveyor and the second conveyor.

7. The robot system according to claim 4, wherein the detector comprises
    a first measurer configured to measure rotation of the first conveyor, and
    a second measurer configured to measure rotation of the second conveyor.

8. The robot system according to claim 1, wherein the robot comprises a parallel link robot.

9. A robot apparatus comprising:
    a robot; and
    a controller configured to control the robot, the controller comprising:
        a situation acquirer configured to acquire a situation in a predetermined monitor area on a first conveyor and a second conveyor, the predetermined monitor area being set in a movable range of the robot;
        a determiner configured to, based on the situation acquired by the situation acquirer, determine whether at least one workpiece among the plurality of kinds of workpieces on the first conveyor in the predetermined monitor area is a missing workpiece of at least one workpiece group among the workpiece groups in the predetermined monitor area; and
        an instructor configured to instruct the robot to hold the at least one workpiece determined as the missing workpiece by the determiner and to transfer the at least one workpiece from the first conveyor to the second conveyor.

10. A method for picking a workpiece in a robot system, the robot system comprising:
    a first conveyor configured to convey a plurality of kinds of workpieces mixed together at random,
    a second conveyor configured to convey workpiece groups each comprising a predetermined combination pattern of the plurality of kinds of workpieces; and
    a robot,
    the method comprising controlling the robot, the controlling step comprising:
        acquiring a situation in a predetermined monitor area on the first conveyor and the second conveyor, the predetermined monitor area being set based on a movable range of the robot;

based on the situation acquired by the situation acquirer, determining whether at least one workpiece among the plurality of kinds of workpieces on the first conveyor in the predetermined monitor area is a missing workpiece of at least one workpiece group among the workpiece groups in the predetermined monitor area; and holding, using the robot, the at least one workpiece determined as the missing workpiece by the determiner and transferring, using the robot, the at least one workpiece from the first conveyor to the second conveyor.

11. The robot system according to claim 2, wherein the at least one workpiece determined as the missing workpiece by the determiner comprises a plurality of missing workpieces, wherein the at least one workpiece group among the workpiece groups in the predetermined monitor area is positioned in a most downstream area of the second conveyor in the predetermined monitor area, and wherein the instructor is configured to instruct the robot to prioritize one missing workpiece, among the plurality of missing workpieces, that is the missing workpiece of the at least one workpiece group so as to hold the one missing workpiece and transfer the one missing workpiece from the first conveyor to the second conveyor.

12. The robot system according to claim 2, further comprising a detector configured to detect a conveyance situation of the first conveyor and the second conveyor, wherein the situation acquirer is configured to acquire the situation in the predetermined monitor area based on the conveyance situation detected by the detector.

13. The robot system according to claim 3, further comprising a detector configured to detect a conveyance situation of the first conveyor and the second conveyor, wherein the situation acquirer is configured to acquire the situation in the predetermined monitor area based on the conveyance situation detected by the detector.

14. The robot system according to claim 11, further comprising a detector configured to detect a conveyance situation of the first conveyor and the second conveyor, wherein the situation acquirer is configured to acquire the situation in the predetermined monitor area based on the conveyance situation detected by the detector.

15. The robot system according to claim 12, wherein the detector comprises a photoelectric sensor.

16. The robot system according to claim 13, wherein the detector comprises a photoelectric sensor.

17. The robot system according to claim 14, wherein the detector comprises a photoelectric sensor.

18. The robot system according to claim 5, wherein the detector comprises a camera configured to pick up an image of the first conveyor and the second conveyor.

19. The robot system according to claim 12, wherein the detector comprises a camera configured to pick up an image of the first conveyor and the second conveyor.

20. The robot system according to claim 13, wherein the detector comprises a camera configured to pick up an image of the first conveyor and the second conveyor.

* * * * *